(12) United States Patent
Speede

(10) Patent No.: US 8,457,668 B2
(45) Date of Patent: Jun. 4, 2013

(54) MOBILE SENDER INITIATED SMS MESSAGE DELETION METHOD AND SYSTEM

(75) Inventor: Claremont Speede, Brandywine, MD (US)

(73) Assignee: Claremont Speede, Brandywine, MD (US)

( * ) Notice: Subject to any disclaimer, the term of this patent is extended or adjusted under 35 U.S.C. 154(b) by 0 days.

(21) Appl. No.: 13/374,827

(22) Filed: Jan. 17, 2012

(65) Prior Publication Data

US 2012/0184248 A1 Jul. 19, 2012

Related U.S. Application Data

(60) Provisional application No. 61/461,439, filed on Jan. 18, 2011.

(51) Int. Cl.
*H04W 4/14* (2009.01)

(52) U.S. Cl.
USPC .......................................................... 455/466

(58) Field of Classification Search
USPC ................... 455/466, 418, 412.1, 414.3, 411, 455/519, 557, 432.3, 412.2; 709/229; 705/17, 705/14.36
See application file for complete search history.

(56) References Cited

U.S. PATENT DOCUMENTS

| | | | |
|---|---|---|---|
| 7,191,219 B2 | 3/2007 | Udell et al. | |
| 7,797,390 B2 | 9/2010 | Hagale et al. | |
| 7,894,580 B2 | 2/2011 | Veen et al. | |
| 8,301,180 B1 * | 10/2012 | Gailloux et al. | 455/466 |
| 2005/0124360 A1 | 6/2005 | Choi | |
| 2007/0167178 A1 * | 7/2007 | Al-Harbi | 455/466 |
| 2009/0042588 A1 | 2/2009 | Lottin et al. | |
| 2010/0205272 A1 * | 8/2010 | Cheung et al. | 709/206 |

OTHER PUBLICATIONS

U.S. Appl. No. 61/461,439, Jan. 18, 2011, Speede.
IBM, SMS (Short message system) Remote Notification Method, PriorArtDatabase, IPCOM000145824D, Jan. 29, 2007, Country: Undisclosed.

* cited by examiner

*Primary Examiner* — Kiet Doan

(57) ABSTRACT

A method and system are provided for remotely deleting short message service messages stored on the remote mobile communication device, by initiating a delete command, or setting a message lifespan when creating a SMS message, from a sender mobile communication device.

10 Claims, 11 Drawing Sheets

MOBILE SENDER INITIATED SMS MESSAGE DELETION METHOD AND SYSTEM

CROSS-REFERENCES TO RELATED APPLICATIONS

This application is a non-provisional application of and claims the benefit of U.S. Provisional Application No. 61/461,439, filed on Jan. 18, 2011 by the present inventor.

BACKGROUND

Prior Art

The following is a tabulation of some prior art that presently appears relevant:

| U.S. patents | | | |
|---|---|---|---|
| Pat. No. | Kind Code | Issue Date | App or Patentee |
| 0,108,621 | A1 | May 19, 2005 | Kim et al. |

Existing deletion solutions have solely depended on a timing mechanism, set and controlled by a central location. The sender of the text message had no control, or knowledge of the text message existence, after it has been sent. Existing systems do not make the mobile sender aware of the successful completion of the deletion of the sent text message. The life cycle of the mobile sender's text message is left to the strength, or weakness of a central system in use, enterprise policy, the receiving end user device, and or the action of message receiver. Transmission of discrete messages, while being secure in the transient state, are left vulnerable when received and stored on the receiver's mobile device.

Accordingly, what is desired is a method for enabling message senders, such as SMS message senders, to have the capability to set, at their own convenience, the life cycle of their sent messages, once the remote devices has received the messages.

FIELD OF THE INVENTION

The present invention generally relates to methods and a message delivery system, and more particularly, to methods and a message delivery system for remotely deleting short message service messages stored on the remote mobile communication device, by initiating a delete command, or setting a message lifespan when creating a SMS message, from a sender mobile communication device.

BACKGROUND OF INVENTION

Concerns about exposure of what was assumed to be confidential exchanges of information, has been the subject of debates aired over the media. It has become obvious that information, once transmitted, may be viewed by third parties along the message communication pathway and by others, the message receiver may choose to disclose to. Many forms of message and communication encryption strategies address the communication pathway disclosure issue, but the end user receiver disclosure still exists. In the mobile space, this problem is magnified several times, due to the obvious transient nature of end users. For example, the sender of a text message has no control or knowledge of the text message's existence, after it has been sent. The life cycle of the mobile sender's text message is left to the message recipient, the strength, or weakness of system in use, and/or enterprise policy. This scenario adds to the problem of information leakage, which remains an issue even if the line of transmission is secure.

Elaborate security schemes are available to ensure confidentiality is ensured. However, the mobile recipient is not considered to be a member of the group of links, in the security chain, that may pose as a concern. For example, a sender transmits an encrypted text message to a mobile receiver, who successfully open and reads the message. This discrete message is unreadable to everyone except the sender and recipient, thus maintaining confidentiality. However, if the receiver decides, on his own, to disclose the content of the message, later to a third party, the sender receiver confidentiality will be compromised.

Therefore, improvements for a mobile communication and a method for managing sent SMS messages, by a message sender, or owner, are needed in the industry to address the aforementioned deficiency.

BRIEF SUMMARY OF THE INVENTION

Embodiments of the present invention provide techniques that enable a sender, using a mobile device, to delete, at any time, a sent text message residing on a receiver's mobile device. After sending a text message to the receiver, the sender will be notified of the opening and reading of the text message located on the receiver's mobile device. With this alert, the sender may chose to delete the remotely located text message. Alternatively, the sender may set a relative time and send a message that will automatically get deleted, at the relative amount of time, after it is opened and read, or at the relative amount of time after it arrives on the device.

A further understanding of the nature and advantages of the invention herein may be realized by reference of the remaining portions in the specifications and the attached drawings.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION OF THE INVENTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
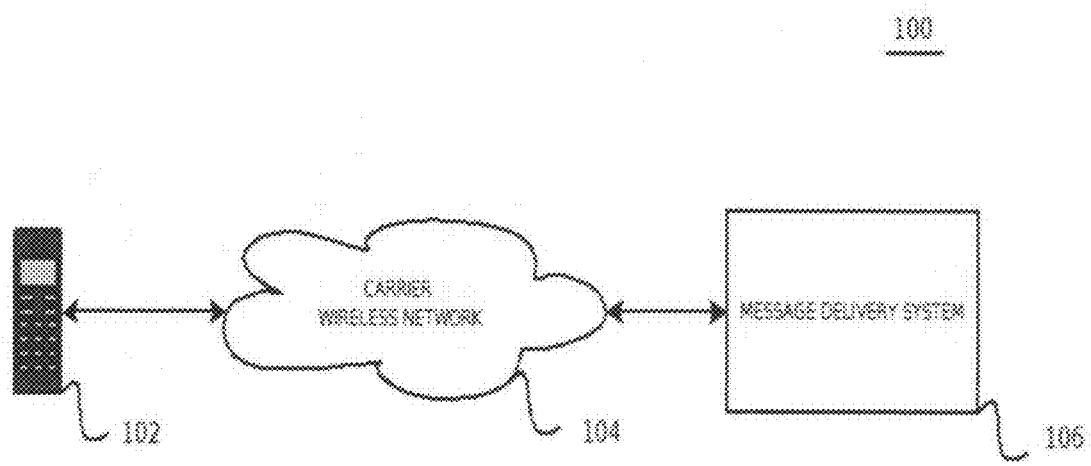
FIG. 1 illustrates a mobile sender initiated SMS deletion network, in accordance with an embodiment of the present invention.

FIG. 1 is a network 100 depicting a mobile sender initiated SMS deletion network, in accordance with an embodiment of the present invention. The network 100 includes a user device 102, a carrier wireless network 104, and a message delivery system 106. As used in this specification, user device 102 will commonly be a cellular telephone having data communication capabilities, although one skilled in the relevant arts will readily appreciate that any communication device, or device having communication capabilities, can be substituted. Similarly, network 104 will commonly be a carrier wireless network throughout this specification, although one skilled in the relevant arts will likewise appreciate that, depending on the capabilities of user device 102, other network types, to include wired networks of any type, or wireless technology of any type (e.g., Bluetooth, cellular, ad hoc, etc.), can be substituted for wireless network 104.

Message delivery system 106 eases the communications between sender and receiver user devices 102, by routing messages from sender user device 102 to receiver user device 102, as further disclosed below, in accordance with an embodiment of the present invention. Furthermore, message delivery system 106 includes logic for establishing communications with user device 102 over carrier wireless network 104, in accordance with an embodiment of the present invention. Carrier wireless network 104 is, in accordance with an additional embodiment of the present invention, a cellular communications network.

II. Network Communications

Figure 2:
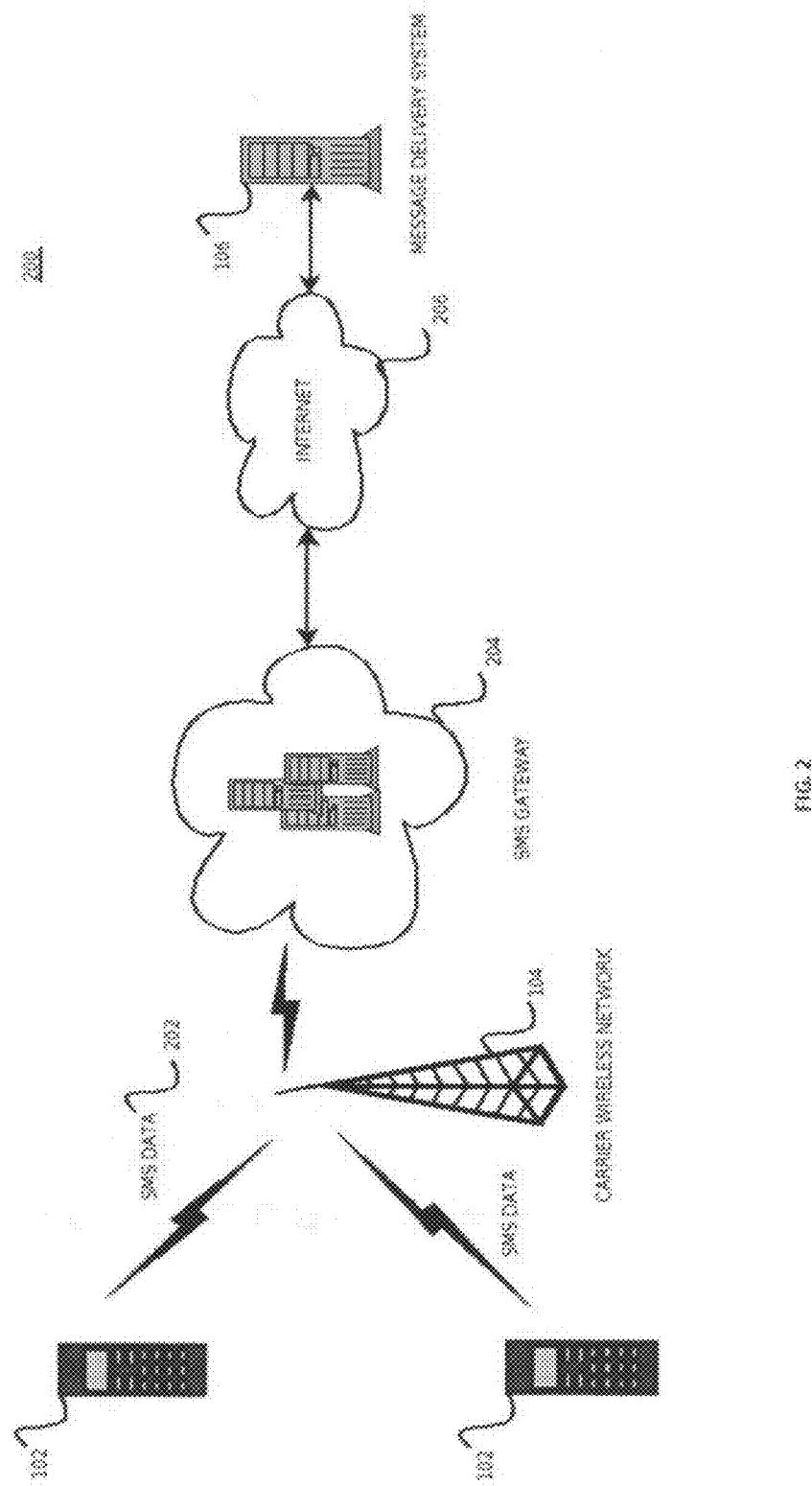
FIG. 2 illustrates communication channels in a mobile sender initiated SMS deletion network, in accordance with an embodiment of the present invention.

FIG. 2 is a network 200 illustrating communication channels in a mobile sender initiated SMS deletion network, in accordance with an embodiment of the present invention. As previously disclosed, a user device 102 is operable to connect to a message delivery system 106 over carrier wireless network 104 in order to send and receive messages. One skilled in the relevant arts will recognize that a user device 102, such as a cellular phone, can communicate using a number of different protocols over a carrier wireless network 104, such as a cellular communications network.

In accordance with an embodiment of the present invention, user device 102 is configured to transmit data conforming to the Short Message Service ("SMS") protocol 202 over carrier wireless network 104. An SMS gateway 204 is used to receive the SMS data 202 communications from carrier wireless network 104 and forward the communications to message delivery system 106, in accordance with an embodiment of the present invention. In accordance with an additional embodiment of the present invention, SMS gateway 204 is the Sybase 365™ system provided by Sybase Inc., an SAP company, of Dublin, Calif. One skilled in the relevant arts will recognize that the precise configuration of the SMS gateway 204 as shown in FIG. 2 need not exist in every system, where instead other means for forwarding the SMS data 202 communications to message delivery system 106 are implemented.

In accordance with an embodiment of the present invention, user device 102 transmits SMS data 202 to SMS gateway 204 through the use of a special "short code" assigned to the message delivery system 106, in order to allow SMS gateway 204 to properly route the SMS data 202 to the message delivery system 106.

III. Message Delivery System

Figure 3:
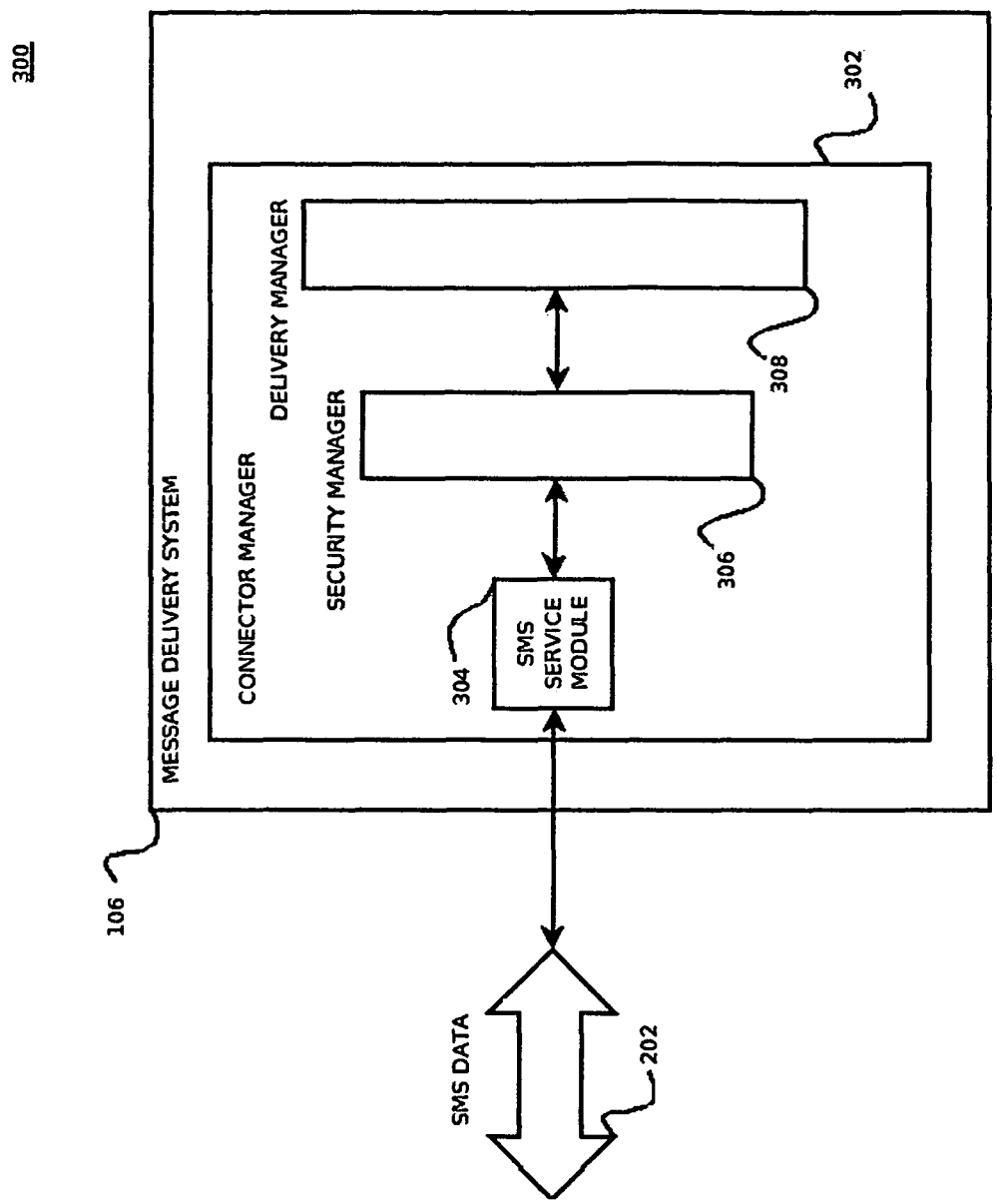
FIG. 3 illustrates a mobile sender initiated SMS deletion message delivery system, in accordance with an embodiment of the present invention.

FIG. 3 is a network 300 illustrating additional features of message delivery system 106, in accordance with an embodiment of the present invention. As previously illustrated in FIG. 2, message delivery system 106 is capable of receiving SMS data 202. Message delivery system comprises a connector manager 302 for managing communications over one or more data channels, such as the connector associated with SMS data 202, in accordance with an embodiment of the present invention. The SMS connection is handled by SMS service module 304 for interfacing with SMS data 202, in accordance with an embodiment of the present invention. One skilled in the relevant arts will appreciate that the capabilities of SMS service module 304 need not be centralized in a single module, and can instead be optionally distributed throughout connection manager 302.

Connector manager 302 further comprises a security manager 306 for authenticating a user or a user device 102, in accordance with an embodiment of the present invention. The security manager 306 determines if a user device 102 is a valid provisioned user before delivery of a message from a user received through a service module, such as service modules 304, by authenticating the user or user device, and enabling the processing of the message if authentication is achieved, in accordance with an embodiment of the present invention.

Connector manager 302 further comprises a delivery manager 308, in accordance with an embodiment of the present invention. Connector manager 302 facilitates the communication of messages received from a sender user device 102 through SMS service module 304 to a receiver user device 102 through a SMS service module 304, which is fully discussed below, in accordance with an embodiment of the present invention. One skilled in the relevant arts will appreciate that the capabilities of delivery manager 308 need not be centralized in a single module, and can instead be optionally distributed throughout connector manager 302. In accordance with an embodiment of the present invention, the capabilities of delivery manager 308 are localized within SMS service module 304. In accordance with a further embodiment of the present invention, the connector manager 302 is part of the delivery manager 308.

Delivery manager 308 enables connector manager 302 to route, an authenticated sender user's or sender user device's 102 message to a receiver user or user device through a SMS service module, such as service module 304, in accordance with an embodiment of the present invention. The functionality of the delivery manager 308 is achieved by utilizing an extracted, intended destination user or user device 102 from some received SMS data 202, to then forward a received SMS data 202 to an intended destination user or user device 102, by use of a service modules, such as SMS service module 304, in accordance with an embodiment of the present invention.

IV. Additional Functionality of The Message Deliver System

Figure 4:
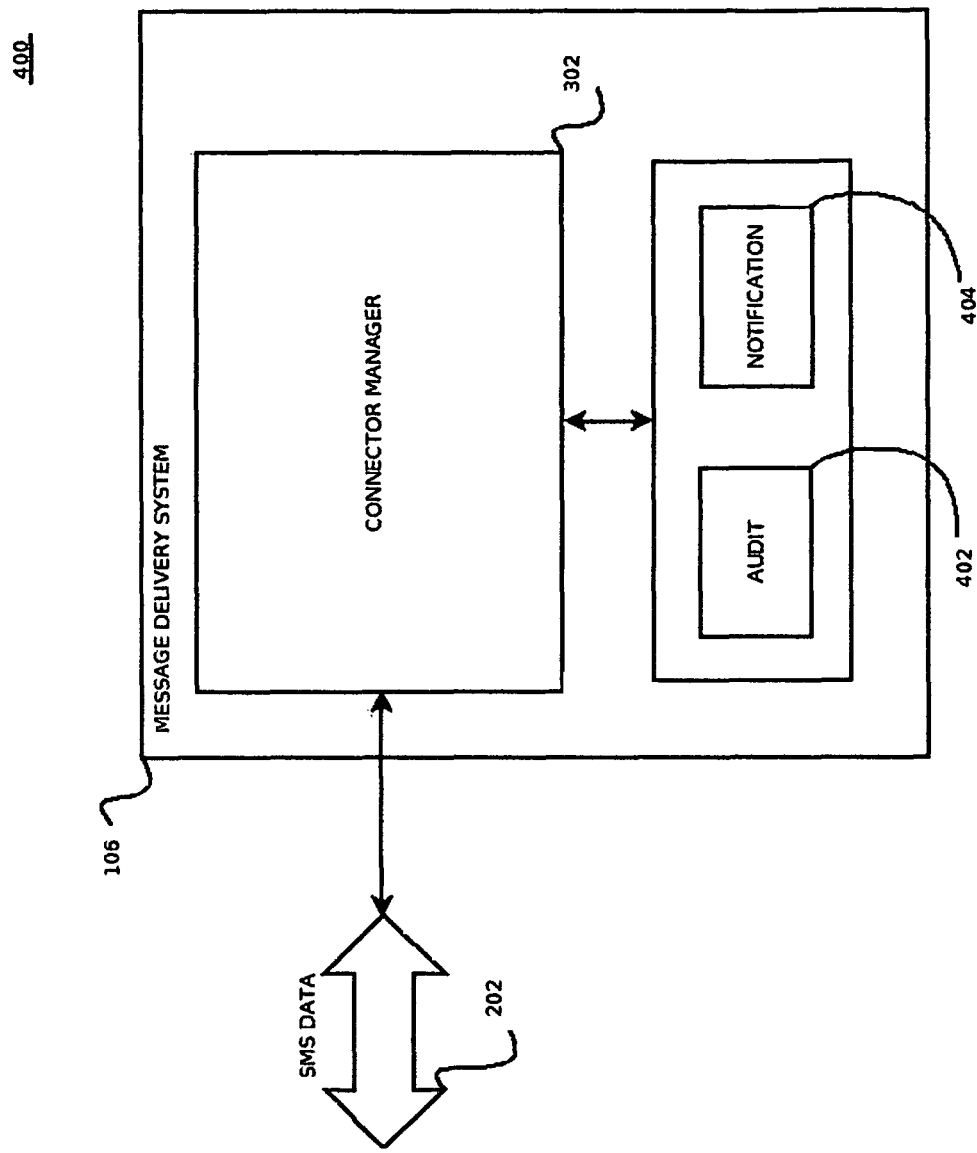
FIG. 4 illustrates additional modules of a mobile sender initiated SMS deletion message delivery system, in accordance with an embodiment of the present invention.

FIG. 4 illustrates a network 400 including message delivery system 106, in accordance with an embodiment of the present invention. As before, message delivery system 106 includes connector manager 302, but also includes additional modules for enhancing the functionality of message delivery system 106. These additional modules are described in more detail below.

Audit module 402 provides a mechanism for storing events and messages that pass through message delivery system 106, in accordance with an embodiment of the present invention. In accordance with an embodiment of the present invention, audit module 402 is configured to store all messages received from a user device 102 in connector manager 302. One skilled in the relevant arts will recognize that audit module 402 can be configured to log any communications occurring within message delivery system 106, in accordance with an embodiment of the present invention.

Notification module 404 is configured to send messages to the user device related to a notification condition, in accordance with an embodiment of the present invention. For example, message delivery system 106 can provide a notification to the user device 102 through notification module 404 if a user's account becomes disabled.

V. Operation Of The Message Delivery System

Figure 5:
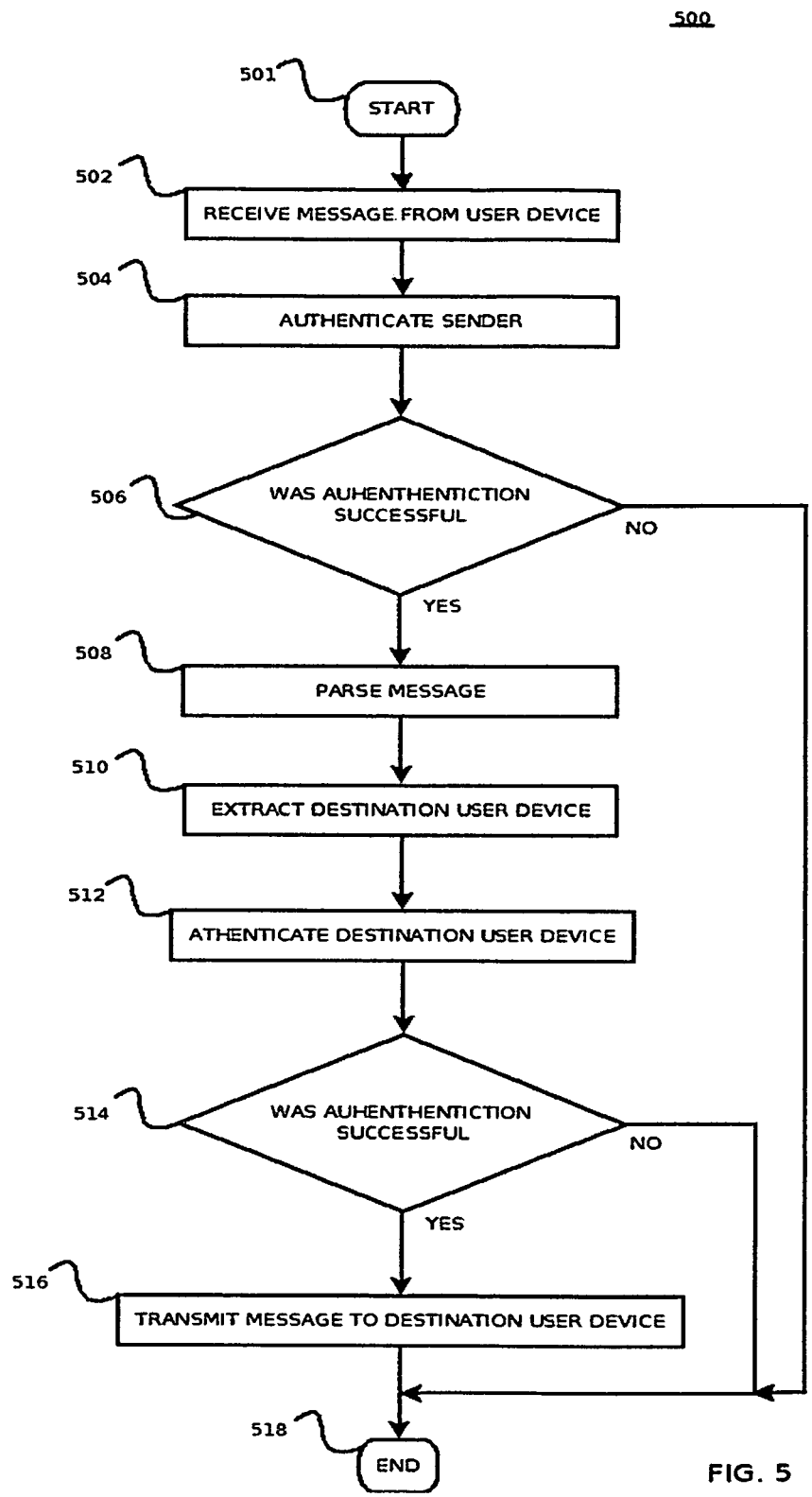
FIG. 5 is a flowchart depicting steps in the operation of a mobile sender initiated SMS deletion message delivery system, in accordance with an embodiment of the present invention.

FIG. 5 is a flowchart 500 depicting an operational flow of message delivery system 106, in accordance with an embodiment of the present invention. Flowchart 500 is described with continued reference to network 300 of FIG. 3. The method begins at step 501 and proceeds to step 502, where the message delivery system 106 receives a SMS data 202 from the user device 102. At step 504, the message delivery system 106 performs authentication on the sender user or user device 102, then process proceeds to step 506. If authentication was unsuccessful 506, the method proceeds to step 518 where processing ends. If authentication was successful 506, the method continues to step 508.

At step 508 of flowchart 500, the message delivery system 106, the SMS data 202 is parsed, in accordance with an embodiment of the present invention, at SMS service module 304 in message delivery system 106. In the process of parsing the SMS data 202, the intended destination user or user device 102 from some received SMS data 202 is extracted 510. Once extraction 510 is complete, step 512 of the message delivery system 106 performs authentication on the destination user or user device 102, then process proceeds to step 514. If authentication was unsuccessful 514, the method proceeds to step 518 where processing ends. If authentication was successful 514, the method continues to step 516.

At step 516 of flowchart 500, the message delivery system 106, the parsed SMS data 202 is then repackaged into the SMS data 202 format, and transmitted to the intended destination user or user device 102 by use of a service modules, such as SMS service module 304, and the method ends at step 518, in accordance with an embodiment of the present invention.

With continued reference to flowchart 500 of FIG. 5, network 300 of FIG. 3, and network 200 of FIG. 2, an example user interaction with message delivery system 106 is disclosed, in accordance with an embodiment of the present invention. A user enters an SMS message (or "text message"), at user device 102 to be delivered to a remote user device 102. In this example, the user enters the message "Hello World". The user then sends this SMS message to the remote user mobile number 102 by entering a mobile number associated with the remote user mobile number 102. In accordance with an embodiment of the present invention, the SMS message is sent to a short code, such as 21221, that uniquely identifies message delivery system 106.

At step 502 of flowchart 500, the message delivery system 106 receives the SMS message 202, and at steps 504 and 512 the message delivery system 106 performs any necessary authentication, as will be fully disclosed herein. If authentication are unsuccessful 506 and 514, the process proceeds to step 518. If authentication are successful 506 and 514, the process continues to step 508 and 516, respectively.

At step 508 of flowchart 500, the message delivery system 106 begins parsing the SMS message to identify one token in the aforementioned message, which represents the destination user or user device 102 from some received SMS data 202, in accordance with an embodiment of the present invention. Next, this token is extracted 510 and step 512 of the message delivery system 106, performs authentication on the destination user or user device 102. If authentication was unsuccessful 514, the method proceeds to step 518 where processing ends. If authentication was successful 514, the method continues to step 516.

At step 516 of flowchart 500, the message delivery system 106, the parsed SMS message is then formatted to fit within the limitations of an SMS message, and transmitted to the intended destination user or user device 102 by use of a service modules, such as SMS service module 304, and the method ends at step 518. For the aforementioned example, the transmitted SMS message would be, in accordance with an embodiment of the present invention.

In accordance with an additional embodiment of the present invention, if the authentication of steps 506 and 514 fails, the process flow is terminated. In accordance with a further embodiment of the present invention.

VI. Operation of The Security Manager

Figure 6:
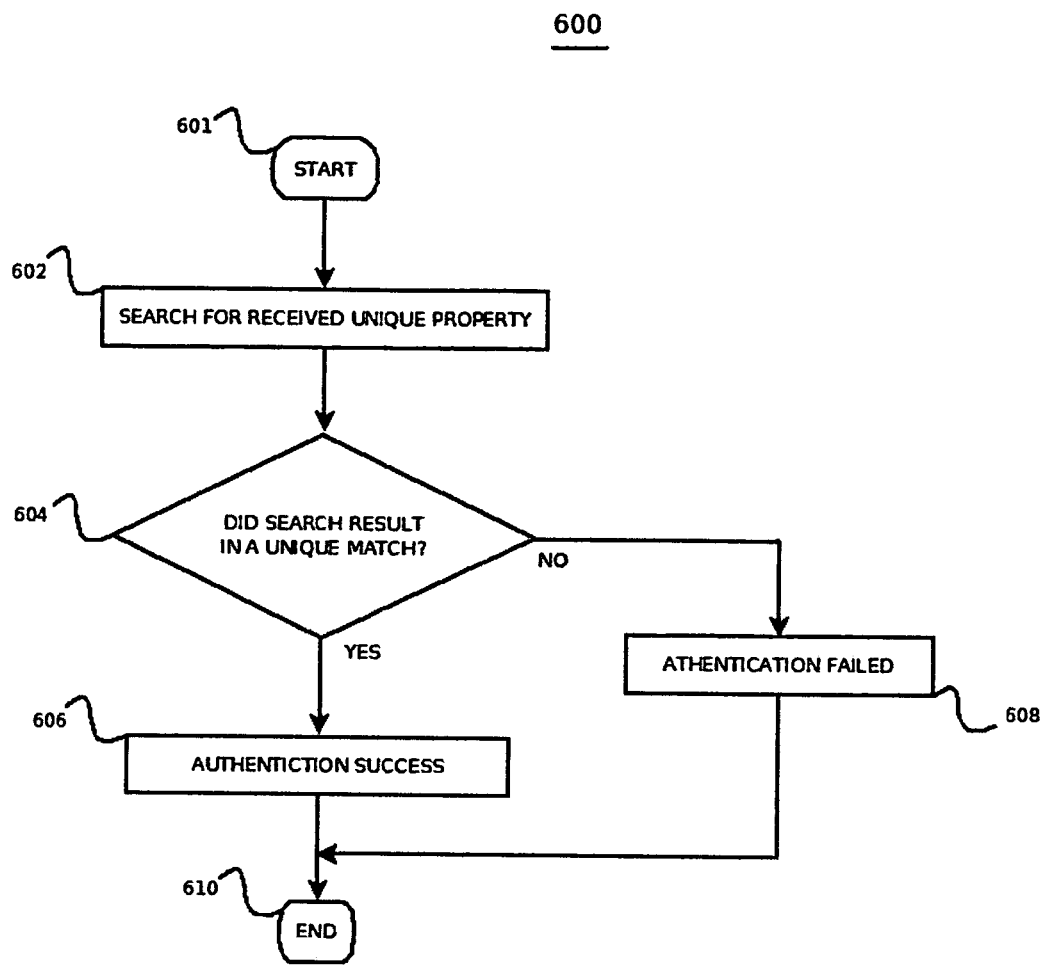
FIG. 6 is a flowchart depicting steps in the operation the security manager residing in a mobile sender initiated SMS deletion message delivery system, in accordance with an embodiment of the present invention.

FIG. 6 is a flowchart 600 depicting an operational flow of security manager 306, in accordance with an embodiment of the present invention. The method begins at step 601 and proceeds to step 602 where a search is performed in order to determine if the received unique property can be found. The result is passed to step 604, in accordance with an embodiment of the present invention. At step 604, it is determined if the result is a valid user, by returning success 606 if indeed the result is a valid user. Step 604 returns failure 608, if the result is determined not to be a valid user, in accordance with an embodiment of the present invention. The process then proceeds to step 610, where it ends.

One skilled in the relevant arts will appreciate that additional means for authentication can be used, and the aforementioned means are described by way of example and not limitation. For example, the SMS message could include a unique password for providing authentication.

VII. Additional Functionality of Service Modules

Figure 7:
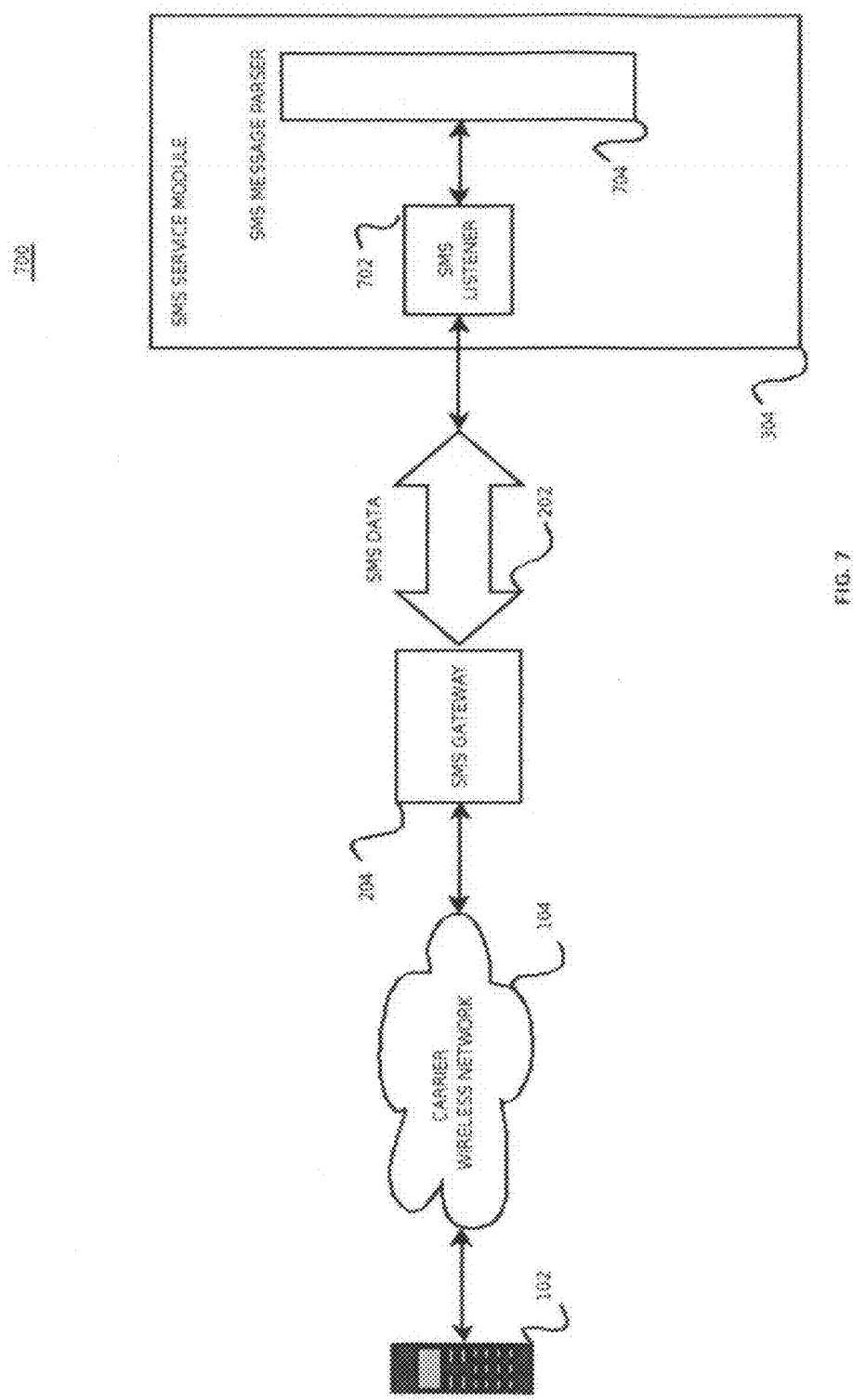
FIG. 7 illustrates an SMS service module for a mobile sender initiated SMS deletion message delivery system, in accordance with an embodiment of the present invention.

FIG. 7 illustrates a network 700 including SMS service module 304, in accordance with an embodiment of the present invention. As previously disclosed, user device 102 is operable to communicate over wireless network 104 with SMS gateway 204 in order to transmit SMS messages to the the message delivery system. SMS messages received by the the message delivery system are handled by SMS service module 304, in accordance with an embodiment of the present invention.

SMS service module 304 includes SMS listener 702, which is configured to receive SMS messages from SMS gateway 204, in accordance with an embodiment of the present invention. SMS service module 304 additionally includes includes SMS message parser 704, which is described in more detail below.

SMS listener 702 captures SMS messages from SMS gateway 210, in accordance with an embodiment of the present invention. In accordance with an additional embodiment of the present invention, SMS listener 702 is configured to receive asynchronous message acknowledgements from SMS gateway 210. In accordance with a further embodiment of the present invention, SMS listener 702 is configured as a bi-directional communications module, and additionally handles the transmission of messages from message delivery system 106 to user device 102 through SMS gateway 210. In accordance with another embodiment of the present invention, the transmission of messages from message delivery system 106 to user device 102 through SMS gateway 210 is handled by a separate SMS Sender Service. One skilled in the relevant arts will appreciate that additional communication configuration exist, and the aforementioned configurations are presented by way of example, and not limitation.

SMS service module 304 includes SMS Message Parser 704, which parses the destination user device 102 from the received SMS data 202, in accordance with an embodiment of the present invention. One skilled in the relevant arts will appreciate that additional communication configuration exist, and the aforementioned configurations are presented by way of example, and not limitation.

VIII. User Device Client Service

Figure 8A:
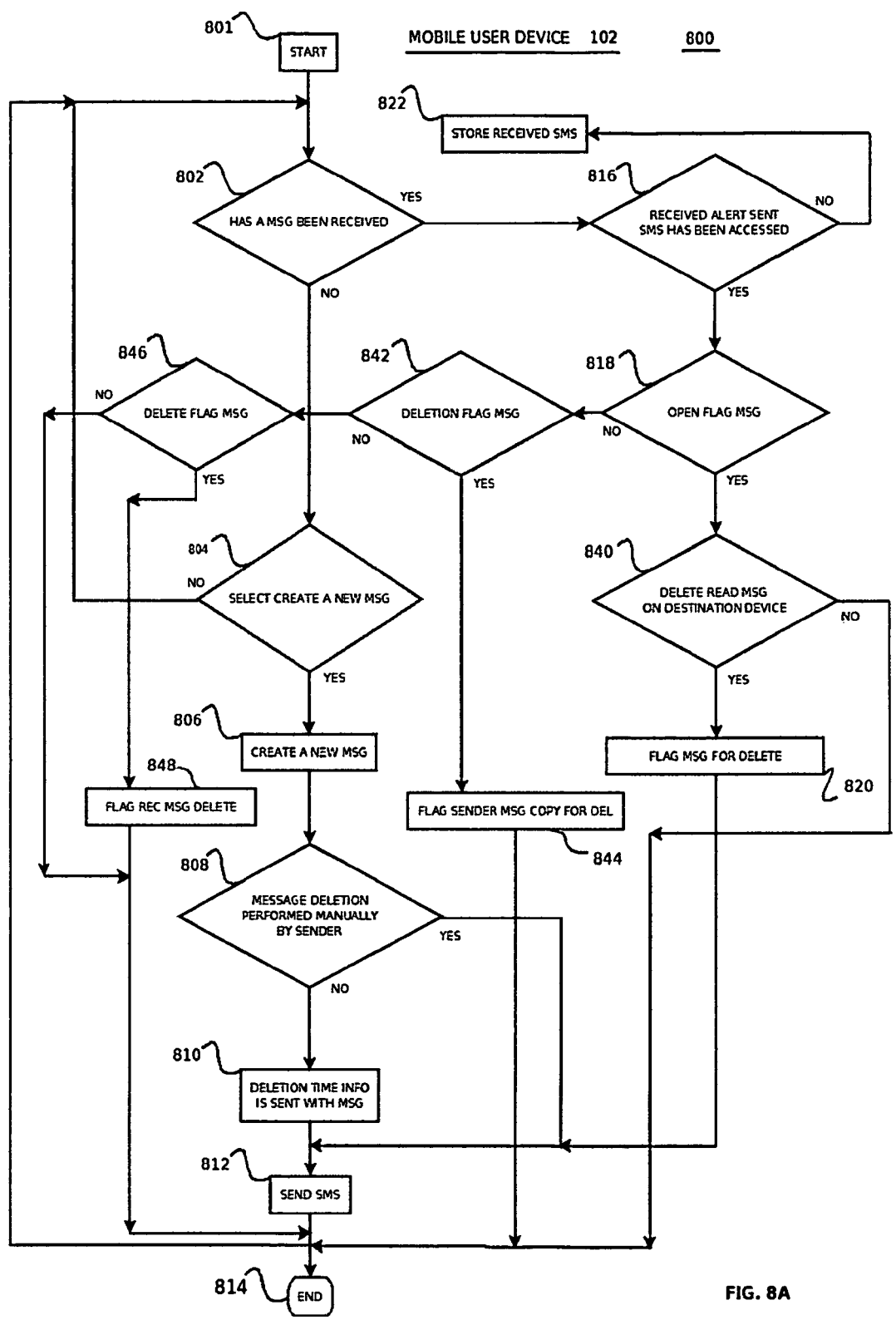
FIG. 8A and FIG. 8B combined, is a flowchart depicting steps of a client service for a mobile sender initiated SMS deletion message delivery system, in accordance with an embodiment of the present invention.
Figure 8B:
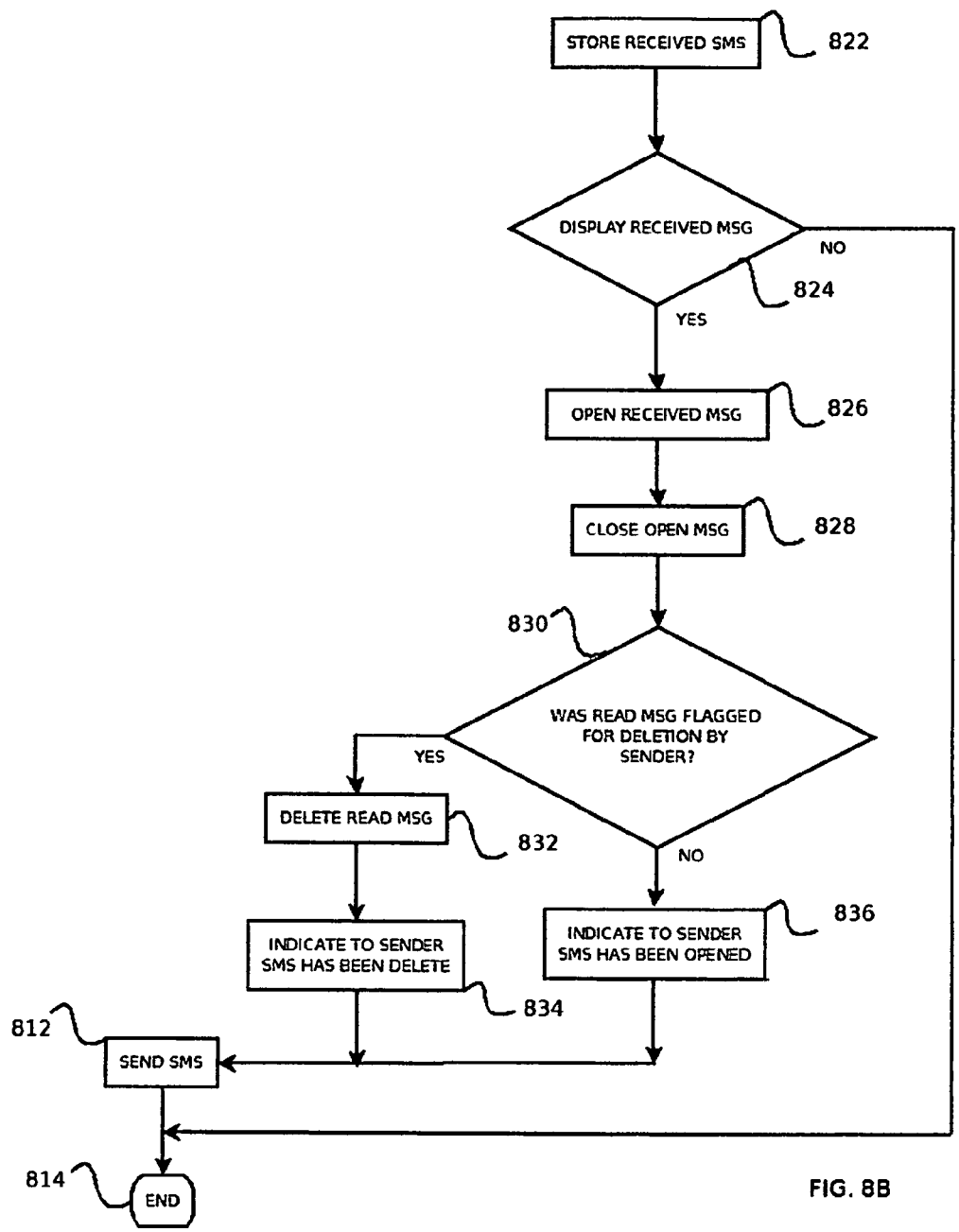

FIG. 8A and FIG. 8B combined, is a flowchart 800 depicting an operational flow of client service on the user device 102, in accordance with an embodiment of the present invention, of transmitting and receiving short message service (SMS) messages, where by a sender user device 102 can delete a sent SMS data 202, on a remote receiver user device 102. The method begins in FIG. 8A at step 801 and proceeds to step 802, where the user device 102 receives a SMS message 202 from a sender user device 102. At step 802, the remote receiver user device 102 performs a check to verify if a SMS data 202 was received. If no SMS data 202 was received, the method proceeds to step 804. If a SMS data 202 was received, the proceeds to step 816, which is described in more detail below, in accordance with an embodiment of the present invention.

At step 804 of flowchart 800, the client service, on the user device 102, verifies if create a new message option is selected, in accordance with an embodiment of the present invention. If it was not selected, step 804 continues to step 802. If it was selected, the method proceeds to step 806. At step 806, a new message is created, in accordance with an embodiment of the present invention. Once the message is created, the method continues to step 808.

At step 808 of flowchart 800, the client service, on the user device 102, verifies if a manual delete is to be performed on the new SMS data 202 when it arrives on the remote user device 102, in accordance with an embodiment of the present invention. If a manual delete is to be performed, message lifespan is set to manual, then the method continues to step 812, which is described in more detail below, in accordance with an embodiment of the present invention. If a manual delete is not to be performed, the method continues to step 810.

At step 810 of flowchart 800, the client service, on the user device 102, set the lifespan of the SMS data 202 to be sent, to automatic of type relative open time, or of type relative arrive time, in accordance with an embodiment of the present invention. The method then continues to step 812.

At step 812 of flowchart 800, the client service, on the user device 102, formats the lifespan, any flags that may be set and message into SMS data 202, and transmits it to the carrier wireless network 104, in accordance with an embodiment of the present invention. The process then proceeds to step 814, where it ends.

At step 816 of flowchart 800, the client service, on the user device 102, verifies if the received SMS data 202 is an alert that a remote receiver user device 102 has performed an action on a previously sent SMS data 202, in accordance with an embodiment of the present invention. If the received SMS data 202 is an alert, the process then proceeds to step 818, which is described in more detail below. If the received SMS data 202 is not an alert, the process then proceeds to step 822.

At step 822 of flowchart 800, the client service, on the user device 102, signals that a SMS data 202 has been received and stores the received SMS data 202. One skilled in the relevant arts will recognize that step 822 can be accomplished by various methods within user device 102, in accordance with an embodiment of the present invention. The process then proceeds to step 824, as will be illustrated in FIG. 8B.

At step 818 of flowchart 800, the the client service, on user device 102, extract the open flag and unique identifier from the alert of the received SMS data 202. One skilled in the relevant arts will recognize that step 818 can be accomplished by various methods within user device 102, in accordance with an embodiment of the present invention. If the flag is determined not to be a set open flag, the process proceeds to step 842, which is described in more detail below. If the flag is determined to be a set open flag, the process proceeds to step 840.

At step 840 of flowchart 800, the client service, on the user device 102, verifies the unique identifier of the manual lifespan SMS data 202 to be deleted on the remote receiver user device, in accordance with an embodiment of the present invention. If, the uniquely identified manual lifespan SMS data 202 is to be deleted on the remote receiver user device, the process proceeds to step 820, which is described in more detail below. If, the uniquely identified manual lifespan SMS data 202 is to be not deleted on the remote receiver user device, the process proceeds to step 814 where processing ends.

At step 820 of flowchart 800, the client service, on the user device 102, sets the delete flag, the unique identifier and an non restrictive lifespan, in accordance with an embodiment of the present invention, and is forwarded to step 812. One skilled in the relevant arts will recognize that step 820 can be accomplished by various methods within user device 102, in accordance with an embodiment of the present invention.

At step 842 of flowchart 800, the client service, on the user device 102, extracts the deletion complete flag and unique identifier from the alert of the received SMS data 202. One skilled in the relevant arts will recognize that step 842 can be accomplished by various methods within user device 102, in accordance with an embodiment of the present invention. If the flag is determined to be a set deletion complete flag, the process proceeds to step 844, which is described in more detail below. If the flag is determined not to be a set deletion complete flag, the process proceeds to step 846.

At step 846 of flowchart 800, the client service, on the user device 102, extracts the delete flag and unique identifier from the alert of the received SMS data 202. One skilled in the relevant arts will recognize that step 846 can be accomplished by various methods within user device 102, in accordance with an embodiment of the present invention. If the flag is determined to be a set delete flag, the process proceeds to step 848, which is described in more detail below. If the flag is determined not to be a set delete flag, the process proceeds to step 812, which is described in more detail above.

At step 844 of flowchart 800, the client service, on the user device 102, utilizes the unique identifier from the alert of the SMS data 202, and flags the sender's copy of the manual lifespan SMS data 202 for deletion. One skilled in the relevant arts will recognize that step 844 can be accomplished by various methods within user device 102, in accordance with an embodiment of the present invention. Deletion of sender's copy of the manual lifespan SMS data 202, may be performed at any time, of the sender's own choosing. The process proceeds to step 812, which is described in more detail above.

At step 848 of flowchart 800, the client service, on the user device 102, utilizes the unique identifier from the alert of the SMS data 202, and sets a delete flag of the uniquely identified manual lifespan SMS data 202, on the receiver user device 102. One skilled in the relevant arts will recognize that step 848 can be accomplished by various methods within user device 102, in accordance with an embodiment of the present invention. The process proceeds to step 814 where processing ends.

The method continues in FIG. 8B at step 822 of flowchart 800, the client service, on the user device 102, signals that a SMS data 202 has been received and stores the received SMS data 202, as previously illustrated in FIG. 8A. The process then proceeds to step 824.

At step 824 of flowchart 800, the client service, on the user device 102, may display the received manual lifespan SMS data 202, which takes the process to step 826, which is described in more detail below, in accordance with an embodiment of the present invention. If the user device 102 does not display the received manual lifespan SMS data 202, the process proceeds to step 814 where processing ends, as previously illustrated in FIG. 8A.

At step 826 of flowchart 800, the client service, on the user device 102, opens the received manual lifespan SMS data 202, displays its message content, flags the manual lifespan SMS data 202 as an opened message, than stores the manual lifespan SMS data 202. One skilled in the relevant arts will recognize that step 826 can be accomplished by various methods within user device 102, in accordance with an embodiment of the present invention. The process then proceeds to step 828. In accordance with an additional embodiment of the present invention, received SMS data 202 with automatic lifespan is discussed.

At step 828 of flowchart 800, the client service, on the user device 102, removes message content of manual lifespan SMS data 202 from the display, then proceeds to step 830, in accordance with an embodiment of the present invention.

At step 830 of flowchart 800, the client service, on the user device 102, verifies if the received manual lifespan SMS data 202 delete flag was set by the sender user device 102, in accordance with an embodiment of the present invention. If received manual lifespan SMS data 202 delete flag was set, the process proceeds to step 832, which is described in more detail below. If received manual lifespan SMS data 202 delete flag was not set, the process proceeds to step 836.

At step 836 of flowchart 800, the client service on the user device 102 sets a open flag, a unique identifier and an non restrictive lifespan, for the received manual lifespan SMS data 202, in accordance with an embodiment of the present invention, is forwarded to step 812, which is illustrated above in FIG. 8A.

At step 832 of flowchart 800, the client service, on the user device 102, deletes the received manual lifespan SMS data 202 from the user device 102 storage. One skilled in the relevant arts will recognize that step 826 can be accomplished by various methods within user device 102, in accordance with an embodiment of the present invention. The process then proceeds to step 834.

At step 834 of flowchart 800, the client service, on the user device 102, sets a deletion complete flag, a unique identifier and an non restrictive lifespan, for the received manual lifespan SMS data 202, in accordance with an embodiment of the present invention, is forwarded to step 812, which is illustrated above in FIG. 8A.

IX. User Device Client Service Automatic Lifespan Message Flagging

Figure 9:
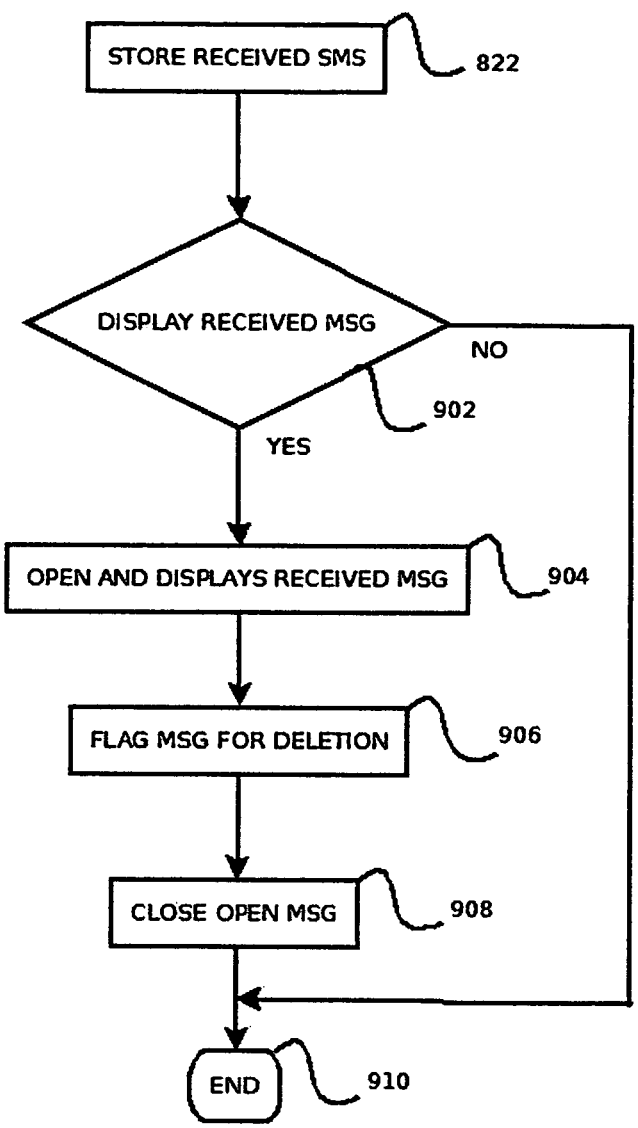
FIG. 9 is a flowchart depicting steps of the flagging process of messages, of type relative open time for automatic lifespan, in a client service for a mobile sender initiated SMS deletion message delivery system, in accordance with an embodiment of the present invention.

FIG. 9 is a flowchart 800 depicting an operational flow of flagging process of automatic lifespan messages, of type relative open time, of the client service on the user device 102, in accordance with an embodiment of the present invention, for the handling of received SMS data 202 that have an automatic lifespan of type relative open time, meaning sender user device 102 has preset the lifespan. As previously illustrated in FIG. 8A, operational flow of the client service on the user device 102, step 822 signals that a SMS data 202 has been received and stores the received SMS data 202. One skilled in the relevant arts will recognize that step 822 can be accomplished by various methods within user device 102, in accordance with an embodiment of the present invention. The process then proceeds to step 902.

At step 902 of flowchart 900, the flagging process of automatic lifespan messages, of type relative open time, of the client service on the user device 102, may display the received SMS data 202, which takes the process to step 904, which is described in more detail below, in accordance with an embodiment of the present invention. If the user device 102 will not display the received SMS data 202, the process proceeds to step 910 where processing ends.

At step 904 of flowchart 900, the flagging process of automatic lifespan messages, of type relative open time, of the client service on the user device 102, opens the stored automatic lifespan SMS data 202, of type relative open time, and displays its message content. The process then proceeds to step 906. In accordance with an additional embodiment of the present invention, received SMS data 202 with automatic lifespan is discussed.

At step 906 of flowchart 900, the flagging process of automatic lifespan messages, of type relative open time, of the client service on the user device 102, flags the automatic lifespan SMS data 202, of type relative open time, as an opened message, then stores the SMS data 202. One skilled in the relevant arts will recognize that step 904 can be accomplished by various methods within user device 102, in accordance with an embodiment of the present invention. The process then proceeds to step 908.

At step 908 of flowchart 900, the flagging process of automatic lifespan messages, of type relative open time, of the client service on the user device 102, removes message content of SMS data 202 from the display, then proceeds to the end at step 910, in accordance with an embodiment of the present invention.

X. User Device Client Service Deletion Background Process

Figure 10:
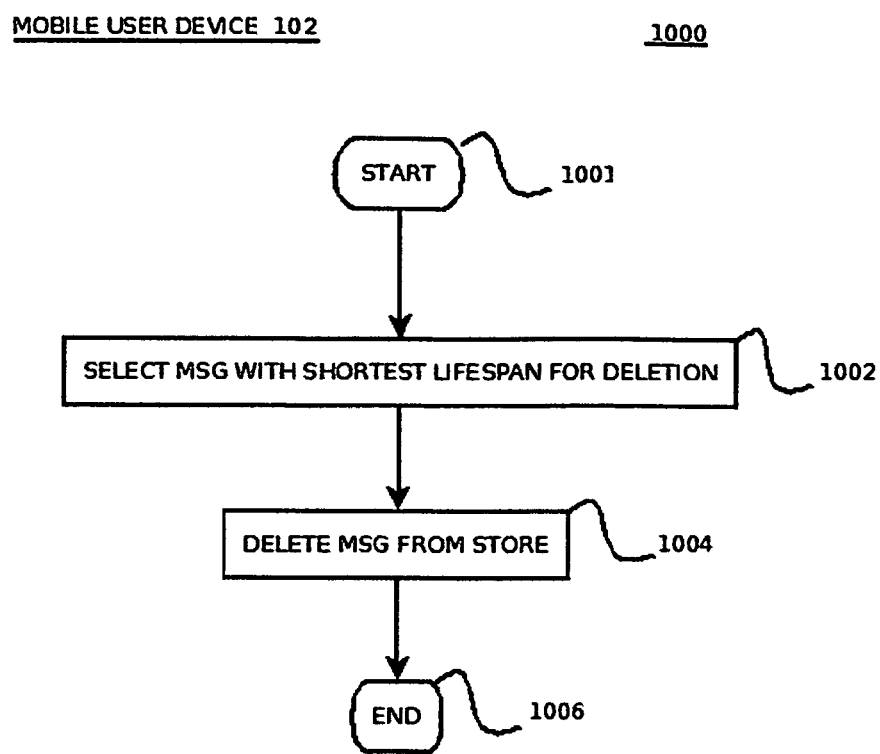
FIG. 10 is a flowchart depicting steps of the deletion background process of a client service for a mobile sender initiated SMS deletion message delivery system, in accordance with an embodiment of the present invention.

FIG. 10 is a flowchart 1000 depicting an operational flow of deletion background process, of a client service on the user device 102, in accordance with an embodiment of the present invention, of expired automatic lifespan and delete flagged manual lifespan SMS data 202. The method begins at step 1001 and proceeds to step 1002, where the process 1002 selects a SMS message from the user device's 102 store, that is the smallest expired automatic lifespan of type relative open time, smallest manual lifespan that has been flagged as delete, or expired automatic lifespan of type relative arrival time. One skilled in the relevant arts will recognize that step 1002 can be accomplished by various methods within user device 102, in accordance with an embodiment of the present invention. The process then proceeds to step 1004.

At step 1004 of flowchart 1000, the deletion background process, of a client service on the user device 102, deletes the selected SMS message from the user device 102 storage. One skilled in the relevant arts will recognize that step 1004 can be accomplished by various methods within user device 102, in accordance with an embodiment of the present invention. The process then proceeds to step 1006, where the process ends.

XI. Advantages

From the description above, a number of advantages of some embodiments of my sender initiated deletion method become evident:

(a) The message sender has full control of the life span of text message.

(b) The message sender has knowledge that message was deleted.

(c) The message sender is made aware that message was opened and or read.

(d) The message sender can limited the exposure of a sent message to third parties, once the message has been received.

XII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

I claim:

1. A method for deleting a short message service message initiated by a remote sender user device, the method comprising: creating a short message service message and setting its lifespan on the user device; sending the short message service message from the user device; receiving the short message service message on the message delivery system; parsing the message to obtain a destination user device on the message delivery system; transmitting the short message service message to the destination user device; receiving and storing short message service messages on the destination user device; opening the short message service message on the destination user device; sending a manual delete SMS alert, from the sender user device, to destination user device; receiving delete SMS alert on the destination user device; deleting of the SMS messages, sent by sender user device, on the destination user device; deleting copy of the SMS messages sent by sender user device on sender user device; background service deleting, on destination user device, opened SMS messages with lowest manual lifespan and flag set to delete; background service searching for and deleting, on destination user device, SMS messages with lowest expired automatic lifespan and flag set to open; background service searching for and deleting, on destination user device, SMS messages with lowest expired automatic lifespan of type relative arrival time.

2. The method according to claim 1, wherein the step of receiving the short message service message on the message delivery system comprises: authenticating the sender user device by comparing a unique property of the user device to a registered value for the unique property.

3. The method according to claim 2, wherein the user device is a phone, and further wherein the unique property is a phone number for the phone.

4. The method according to claim 1, wherein the step of parsing the message to obtain a destination user device on the message delivery system comprises: authenticating the destination user device by comparing a unique property of the user device to a registered value for the unique property.

5. The method according to claim 4, wherein the user device is a phone, and further wherein the unique property is a phone number for the phone.

6. The method according to claim 1, wherein the step of setting the lifespan comprises: selecting from a set of lifespan levels comprising: manual, automatic relative open time, and automatic relative arrival time.

7. The method according to claim 1, wherein the step of opening a received SMS the user device comprises: sending open SMS message alert, on the destination user device, to the sender user device.

8. The method according to claim 1, wherein the step of sending a manual delete SMS command, from the sender user device, to destination user device comprises: receiving an open SMS message alert on the sender user device.

9. The method according to claim 1, wherein the step of deleting of the SMS messages, sent by sender user device, on the destination user device comprises: sending deletion complete SMS messages alert to the sender user device, from the destination user device.

10. The method according to claim 1, wherein the step of deleting copy of the SMS messages sent by sender user device on sender user device comprises receiving deletion complete SMS messages alert on the sender user device.

* * * * *